(12) United States Patent
Niemczyk

(10) Patent No.: US 9,688,099 B2
(45) Date of Patent: Jun. 27, 2017

(54) MOUNTING ARRANGEMENT FOR INSTALLING AUXILIARY VEHICLE WHEELS

(71) Applicant: Andrew Niemczyk, Hazel Park, MI (US)

(72) Inventor: Andrew Niemczyk, Hazel Park, MI (US)

( * ) Notice: Subject to any disclaimer, the term of this patent is extended or adjusted under 35 U.S.C. 154(b) by 0 days.

(21) Appl. No.: 14/702,853

(22) Filed: May 4, 2015

(65) Prior Publication Data

US 2016/0297237 A1    Oct. 13, 2016

Related U.S. Application Data

(60) Provisional application No. 62/146,529, filed on Apr. 13, 2015.

(51) Int. Cl.
*B60B 11/02* (2006.01)

(52) U.S. Cl.
CPC ......... *B60B 11/02* (2013.01); *B60B 2900/311* (2013.01); *B60B 2900/711* (2013.01)

(58) Field of Classification Search
CPC ......... B60B 11/02; B60B 11/06; B60B 15/26; B60B 15/263
USPC .............................. 301/35.628, 35.629, 40.2
See application file for complete search history.

(56) References Cited

U.S. PATENT DOCUMENTS

| | | | |
|---|---|---|---|
| 2,635,012 A | 4/1953 | Rappaport | |
| 3,039,825 A * | 6/1962 | Clark | B60B 11/06 301/36.1 |
| 3,664,709 A | 5/1972 | Barr'e | |
| 3,790,218 A | 2/1974 | Johns | |
| 3,840,273 A * | 10/1974 | Johns | B60B 11/02 301/35.628 |
| 3,990,747 A | 11/1976 | Long | |
| 4,070,066 A | 1/1978 | Reppert et al. | |
| 4,135,765 A | 1/1979 | Hardwicke | |
| 4,164,358 A | 8/1979 | Entrup | |
| 4,214,792 A * | 7/1980 | Hardwicke | B60B 11/02 301/36.1 |
| 4,261,621 A * | 4/1981 | Fox | B60B 11/02 301/35.628 |
| 4,333,688 A * | 6/1982 | Lemmon | B60B 11/02 301/36.1 |
| 4,396,232 A | 8/1983 | Fox | |
| 4,473,258 A * | 9/1984 | Fox | B60B 11/02 301/35.628 |

(Continued)

*Primary Examiner* — Kip T Kotter
(74) *Attorney, Agent, or Firm* — John R. Benefiel

(57) ABSTRACT

A mounting arrangement for adding an auxiliary wheel spaced from an existing wheel of a motor vehicle including three generally cylindrical spacers connected together abutting end to end, an inner spacer attached to a brake assembly member with a preexisting wheel rim compressed between an inside face of the inner spacer and the brake assembly member, an intermediate spacer attached to an outside end of the inner spacer by bolts passing through axial holes through the intermediate spacer end threaded into holes in the outside end of the inner spacer and an outer spacer connected on its inside end to the outer end of the intermediate spacer by bolts, and holding stud bolts extending out and received through holes in the auxiliary wheel rim, with lug nuts fixing the rim of the auxiliary wheel against the outside end of the outer spacer.

12 Claims, 8 Drawing Sheets

(56) References Cited

U.S. PATENT DOCUMENTS

| | | | |
|---|---|---|---|
| 4,585,276 A | | 4/1986 | Tirheimer |
| 4,718,732 A | * | 1/1988 | Osborne ................ B60B 3/147 |
| | | | 301/128 |
| 4,776,640 A | | 10/1988 | Rezza |
| 4,787,679 A | | 11/1988 | Arnold |
| 4,902,074 A | | 2/1990 | DeRegnaucourt et al. |
| 5,100,205 A | * | 3/1992 | Hardwicke ............ B60B 11/02 |
| | | | 301/36.1 |
| 5,785,391 A | * | 7/1998 | Parry .................... B60B 3/147 |
| | | | 301/111.04 |
| 6,250,722 B1 | | 6/2001 | Radke |
| 6,568,764 B2 | | 5/2003 | McNeil et al. |
| 6,848,526 B2 | | 2/2005 | Burt et al. |
| 7,040,713 B2 | | 5/2006 | Rudolf et al. |
| 7,413,259 B2 | | 8/2008 | Verdun et al. |
| 8,690,265 B2 | | 4/2014 | Noblanc et al. |
| 2002/0190570 A1 | * | 12/2002 | Gorges ................... B60B 3/145 |
| | | | 301/35.629 |
| 2013/0234496 A1 | * | 9/2013 | Gengerke ............. B60B 11/02 |
| | | | 301/35.628 |
| 2015/0123453 A1 | * | 5/2015 | Benoit, Jr. ............. B60B 11/02 |
| | | | 301/35.628 |

\* cited by examiner

MOUNTING ARRANGEMENT FOR INSTALLING AUXILIARY VEHICLE WHEELS

CROSS REFERENCE TO RELATED APPLICATIONS

This application claims the benefit of U.S. provisional patent application No. 62/146,529 filed on Apr. 13, 2015.

BACKGROUND OF THE INVENTION

This application concerns a mounting arrangement allowing one or more wheels to be added to a motor vehicle axle for achieving improved traction and support for the vehicle weight when being driven on unpaved surfaces.

It has long been realized that adding one or more auxiliary wheels to at least two vehicle axles will greatly improve mobility particularly when driving off road.

Various adapters and extensions have been devised to add such auxiliary wheels, but none of these have provided a practical and conveniently installed mounting of such wheels.

Any mounting must provide adequate support for the auxiliary wheel and should be convenient to install in the field when extra traction and support is needed.

Some prior mounting arrangements are complex and require special wheel rims, which add substantially to the expense of adding auxiliary wheels.

In other mountings, the mounted wheels are spaced too close together allowing mud to become packed into the gap between the wheels, which must be removed periodically.

Also, mountings for auxiliary wheels must not have any gaps or clearances between the moving components because the presence of clearances may lead to loosening of the components over time. At the same time, some clearances are necessary in order to be able to assemble the components and connect them to an existing axle.

The components themselves must also be sufficiently sturdy to adequately support the auxiliary wheels, but also should not be too heavy such as to make the vehicle too heavy and thus affect the rate of fuel consumption of the vehicle.

It is an object of the present invention to provide a mounting arrangement for adding auxiliary wheels to trucks or other motor vehicles, which also provides adequate support for any auxiliary wheels.

It is an additional object to provide such mounting arrangement which allows the use of standard wheel rims and is easy and quick to install when needed.

It is a further object to provide such mounting arrangement for adding auxiliary wheels which eliminates any clearances which could cause looseness over time while still allowing assembly of the wheel to the mounting components.

SUMMARY OF THE INVENTION

The above recited objects and other objects which will understood by those skilled in the art are achieved by a mounting arrangement including three generally cylindrical spacers having interfit and abutting ends fixed together.

A first or inner spacer closest to the axle has a series of counterbored holes arranged about its perimeter opening into an outer end of the inner spacer, each hole aligned smaller diameter hole opening into the inside end of the inner spacer and a series of wheel mounting studs projecting from an existing member of a brake assembly. Lug nuts are inserted into the larger diameter holes and threaded onto the lug studs. The inner spacer has a circular shoulder projecting through a central wheel rim opening, with a lip extending around the rim opening compressed by tightening the lug nuts against the brake assembly member to be deflected inwardly into tight engagement with the outside diameter of a shoulder on the inner spacer to eliminate any clearances between the rim and the inner spacer.

A second or intermediate spacer has an inboard end having a shoulder projecting into an inner diameter of a central opening extending into the outside end of the inner spacer with the shoulder abutting an outside end of the inner spacer, and held thereagainst as with an annular set of bolts located around the axis of the inner spacer an intermediate spacer having a shoulder received into a stepped diameter or counterbored hole in the outboard end of the intermediate spacer and extending out into an aligned set of threaded axial holes in the outside end of the inner spacer so that the inner and intermediate spacers are held together abutted end to end.

A third or outer cylindrical spacer is held with its inner end in abutment with the outside end of the intermediate spacer. A counterbored opening is recessed into the inner side of the outer spacer which slidably receives a shoulder projecting from the outside end of the intermediate spacer.

The inside end of the outer spacer abuts the outside end of the intermediate spacer and tightly held there against as by an annular series of bolts received into corresponding set of counterbored holes extending into the outside end of the outer spacer and received into corresponding threaded holes in the outside end of the intermediate spacer.

A series of interspaced stud bolts are received in a corresponding set of axial holes extending in to the inner end of the outer spacer and project out from the outer end of the outer spacer.

A rim of an auxiliary wheel to be installed has a large central opening defined by an inwardly angled lip is received onto an outer reduced diameter shoulder at the end of the outer spacer. The wheel rim has a set of holes into which is received the outer spacer stud bolts. Lug nuts are threaded onto the stud bolts and compress the wheel rim lip against a shoulder formed by the reduced diameter shoulder on the outer spacer deforming the lip inwardly and against the outside diameter of the reduced diameter shoulder to eliminate any clearance spaces.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
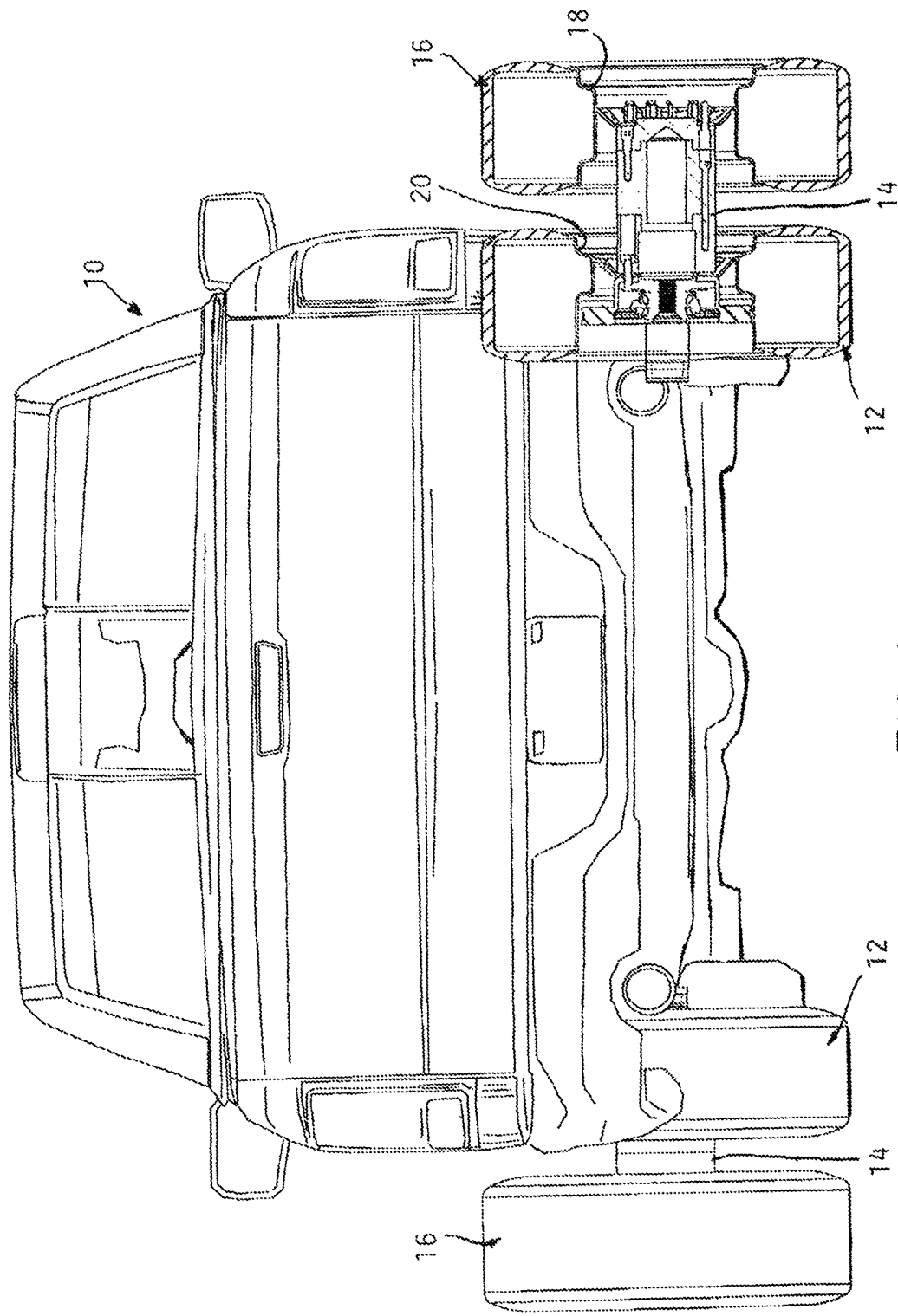
FIG. 1 is a pictorial rear view of a pickup truck having an auxiliary wheel installed on each rear axle using mounting arrangements according to the invention.

Referring to the Drawings, FIG. 1 shows a pickup truck 10 in which an auxiliary wheel 16 has been added on each side by means of a mounting arrangement 14 according to the invention.

Each auxiliary wheel 16 is located spaced away from the preexisting original equipment wheel 12 by the mounting arrangement 14.

The wheels 12, 16 are connected by attaching the standard rims 18, 20 of the wheels 12, 16 to an end of a respective mounting arrangement 14 as described in detail hereinafter.

Figure 2:
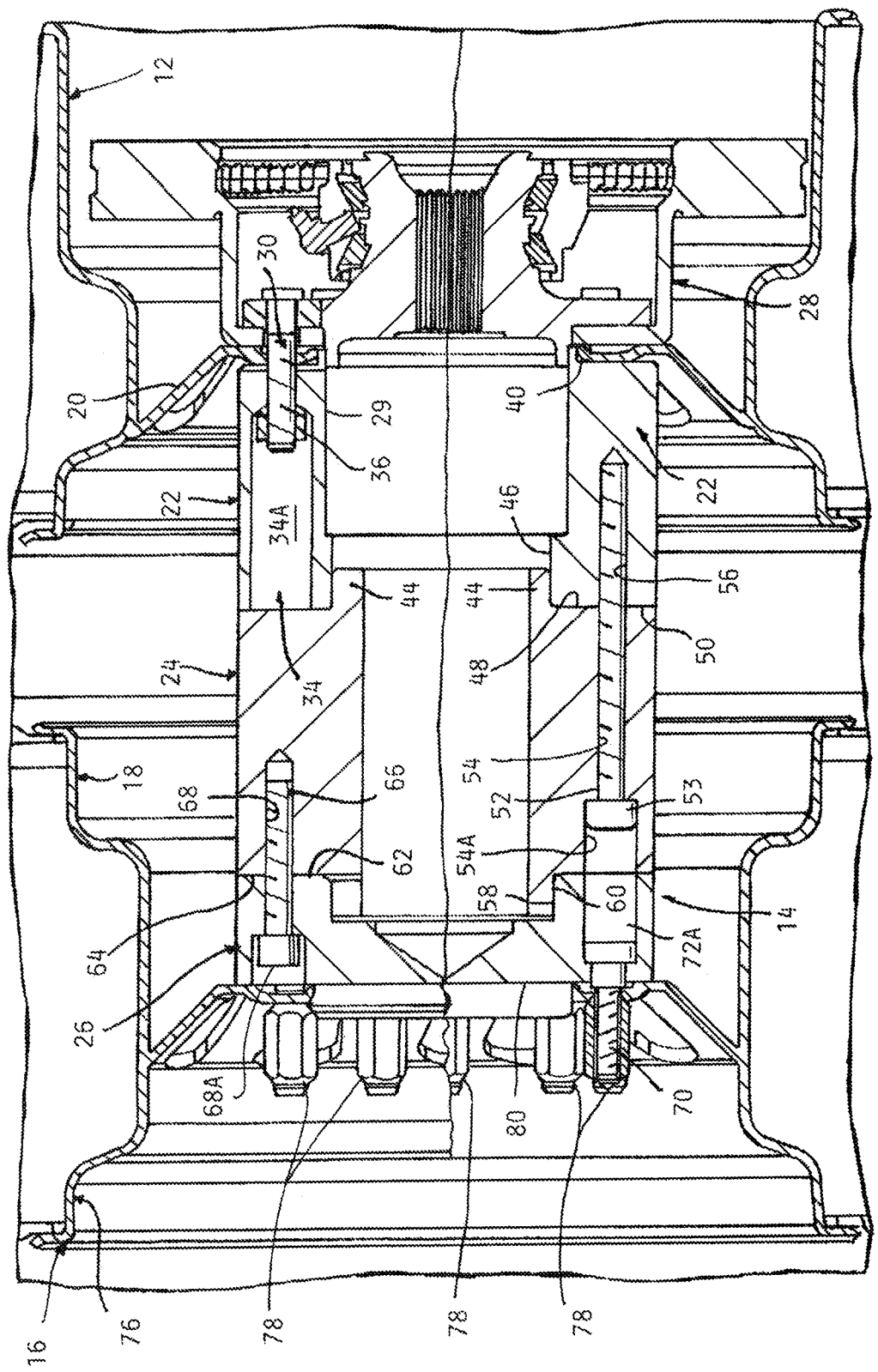
FIG. 2 is a partially sectional view of the mounting arrangements according to the invention assembled to each rear axle with a pair of auxiliary wheel rims installed thereon.
Figure 3:
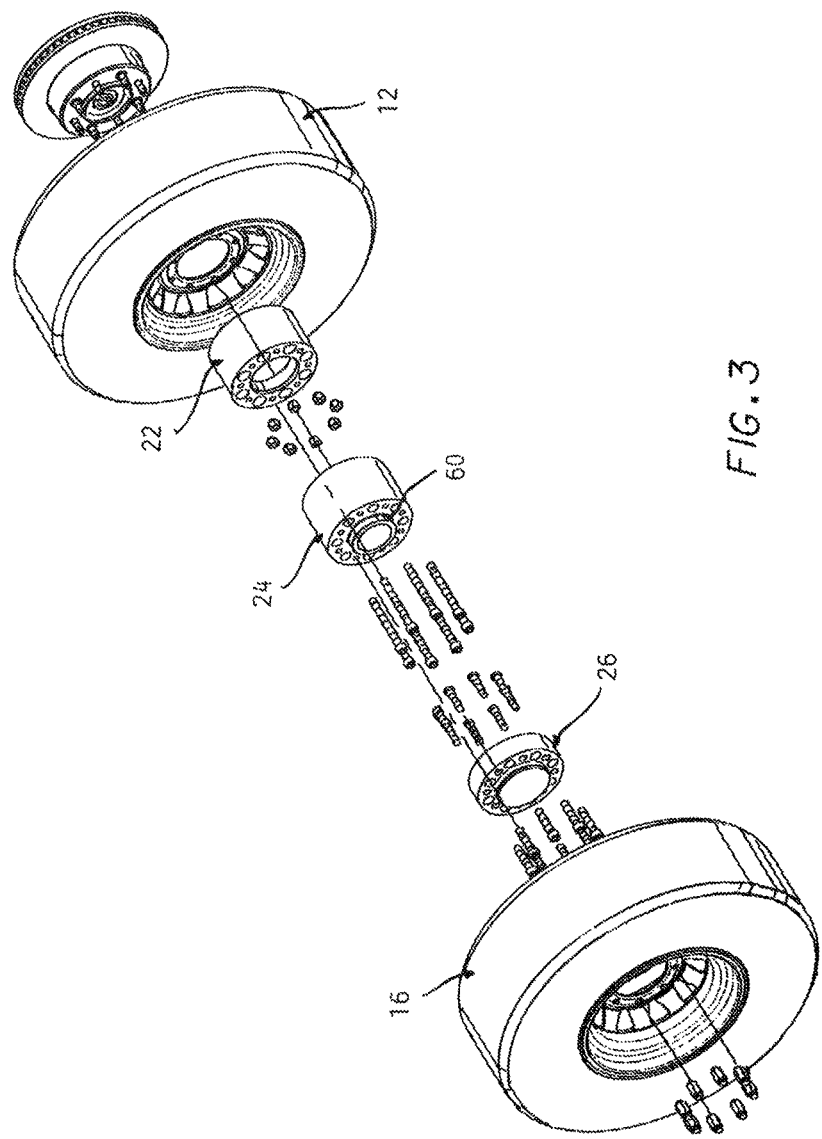
FIG. 3 is an exploded pictorial view from the left of the components of the mounting arrangement and the two wheel rims to be installed shown in FIG. 2.

Referring to FIG. 2, each mounting arrangement 14 is comprised of three joined together spacers, a first or inner spacer 22, a second or intermediate spacer 24 and a third or outer spacer 26, each preferably made of aluminum and of a generally cylindrical shape.

Figure 4:
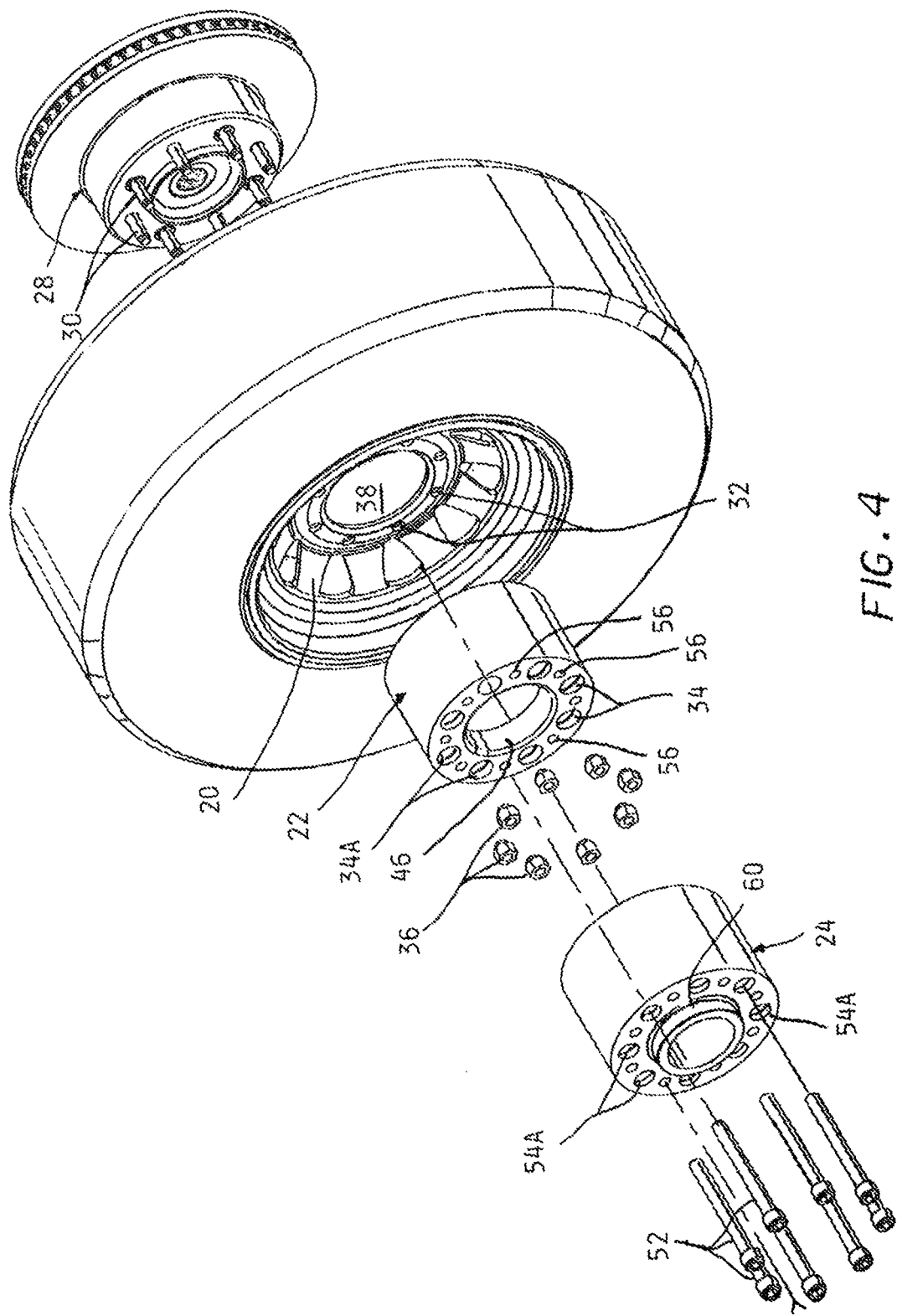
FIG. 4 is an exploded pictorial view from the left of an original equipment wheel and some of the components of the mounting arrangement shown in FIGS. 2 and 3 associated therewith.
Figure 5:
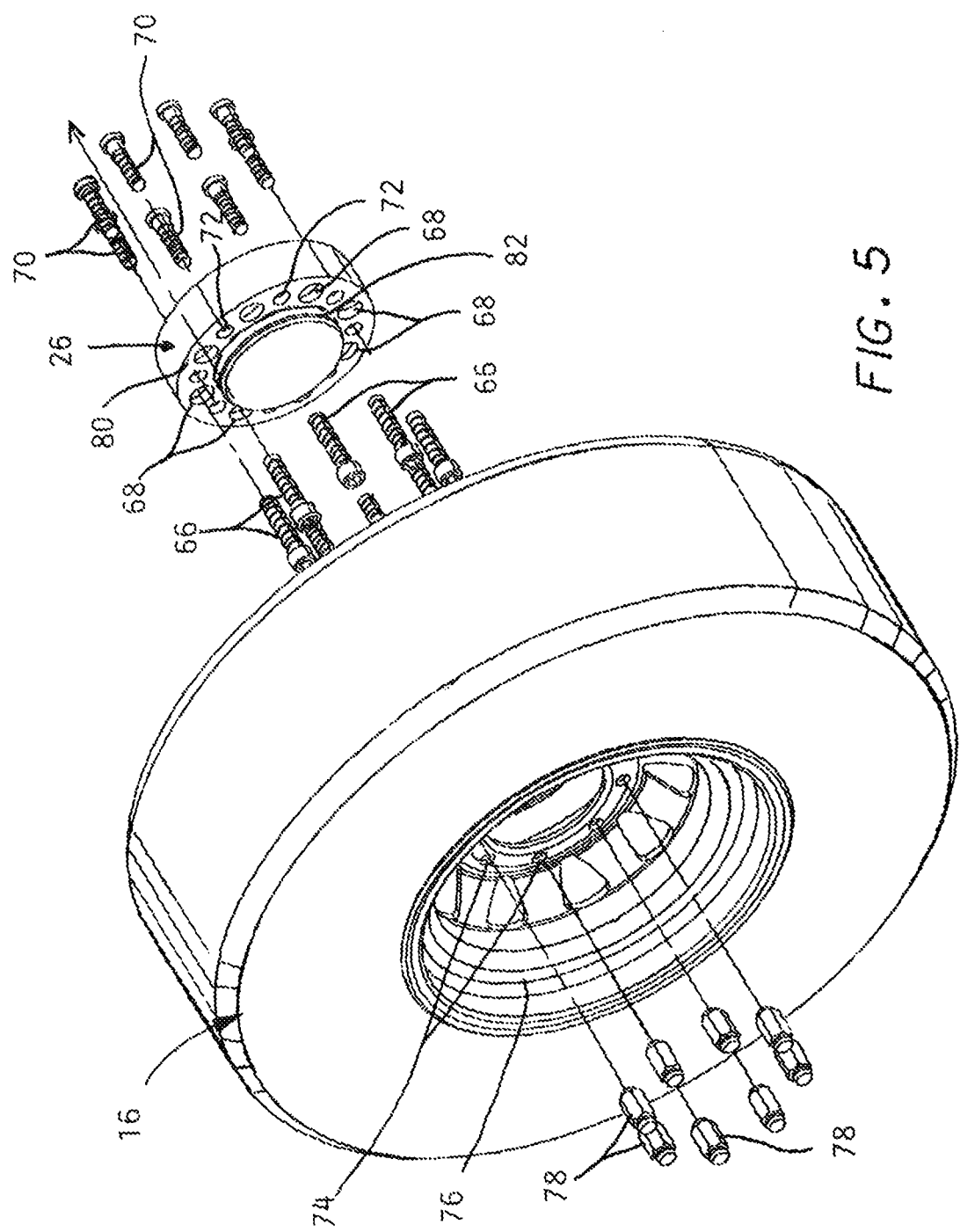
FIG. 5 is an enlarged exploded pictorial view from the left of an auxiliary wheel to be installed and the components of the arrangement shown in FIGS. 2 and 3 associated therewith.

The inner spacer 22 is fixedly attached to an existing brake assembly member 28 by a set of stud bolts 30 which each pass through one of the holes 32 arranged around the wheel rim 20 (FIG. 4) and thence through an annular array of aligned counterbored holes 34 in the inner spacer 22. Lug nuts 36 are accommodated by the larger diameter portion 34A of counterbored holes 34 aligned with stud bolt receiving hole portions 34B so as to allow a socket wrench to tighten the lug nuts 36 and secure the wheel rim 20 in place by being clamped between the right side of the inner spacer 22 and the left side of a brake assembly member 28.

As best seen in FIG. 2, a large diameter opening 38 centered in the wheel rim 20 (FIG. 4) receives a reduced diameter shoulder 40 of inner spacer 22 projecting through the opening 38. Clearances are provided to enable assembly together of the wheel rim 20, inner spacer 22 over the stud bolts 30, the inside diameter 23 and a shoulder 29 of the brake assembly member 28. However, these clearances could cause development of looseness in the connections over time as the wheels and the mounting spacers 22, 24, 26 are rotated at high speed when the vehicle is being driven.

Figure 6:
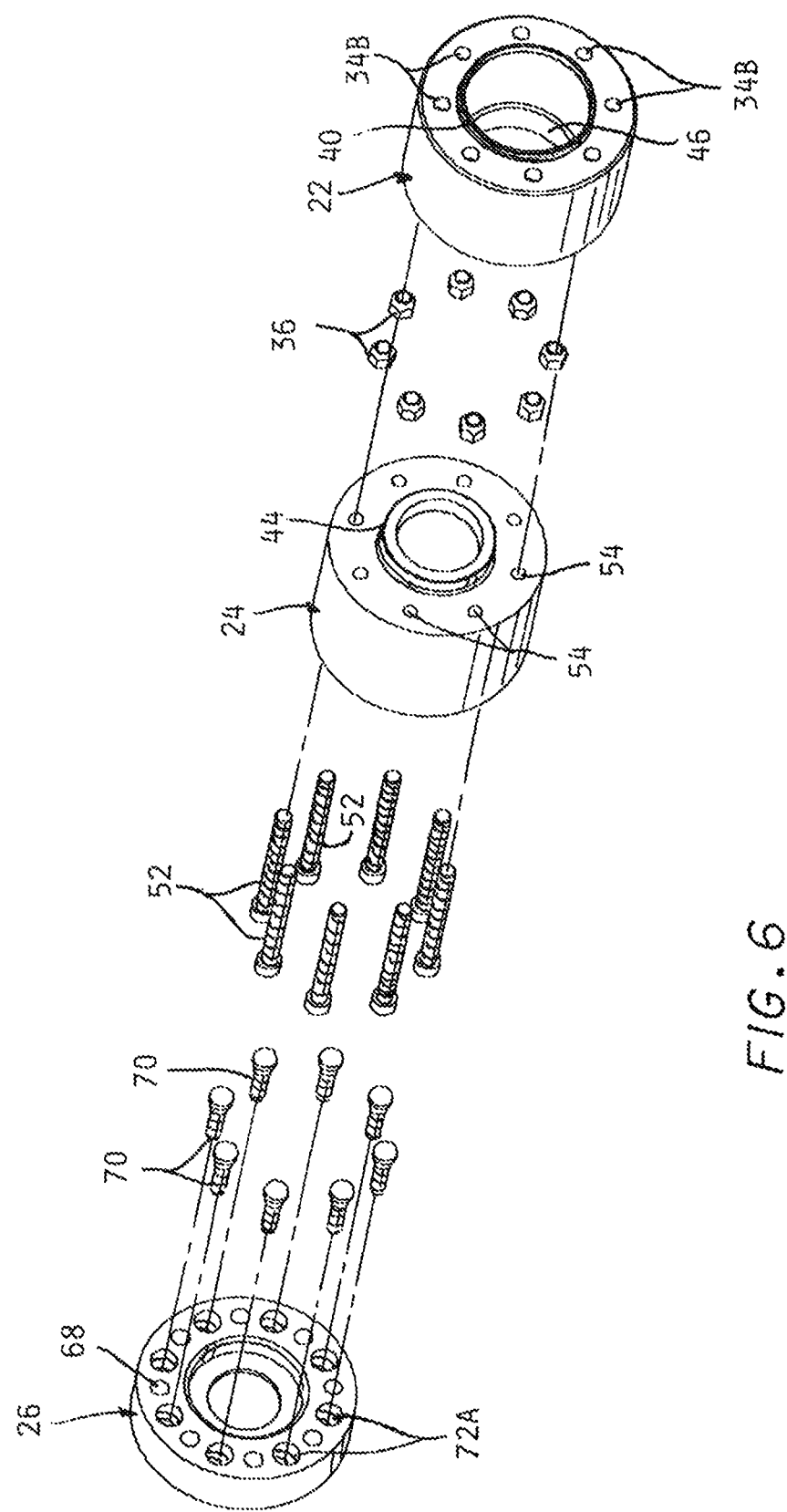
FIG. 6 is an exploded pictorial view of three spacer from the right included in the mounting arrangement according to the invention.

The standard wheel rim 20 has an angled lip 42 formed around the opening 38, which is compressed by tightening of the lug nuts 36. This tightening of the lug nuts 36 forces the lip 42 to be deflected inwardly to engage the shoulder 40 (FIG. 6) and completely eliminate any clearance to create a tight fit of the wheel rim 20 onto the inner spacer 22.

The second or intermediate spacer 24 is formed with a reduced diameter right side shoulder 44 which is slidably received in the inside diameter of a left side counterbore 46 in the inner spacer 22 (FIG. 2) to be centered thereon. Obviously these locations of the recess 58 and shoulder 60 could be reversed.

The right end face 48 of the intermediate spacer 24 is held in abutment against the outer end face 50 of the inner spacer 22 by a circular array of long bolts 52 each received and passing through holes 54 extending axially completely through the intermediate spacer 24, with the threaded end of each bolt 52 advanced into a threaded hole 56 extending into the outer side of the inner spacer 22. The head 53 of each bolt 52 seats at the bottom of a counterbore 54A of an associated hole 54.

The outer spacer 26 has a recess 58 receiving therein a left side reduced diameter shoulder 60 with a sliding fit therebetween. Obviously these locations of the recess 58 and shoulder 60 could be reversed.

A right end face 62 of outer spacer 26 is held in abutment against a left end face 64 of the intermediate spacer 24 by a circular array of bolts 66 received in a respective one of holes 68. A counterbore 68A of each hole 68 accommodates the head of the bolt 66 received therein with sufficient clearance so as to allow tightening with a socket wrench (not shown).

A circular array of stud bolts 70 are installed to extend through holes 72 in outer spacer 26 with counterbores 72A accommodating the heads thereof.

The stud bolts 70 project through the left end of the outer spacer 26 and through mounting holes 74 of a conventional rim 76 of the auxiliary wheel 16.

Figure 7:
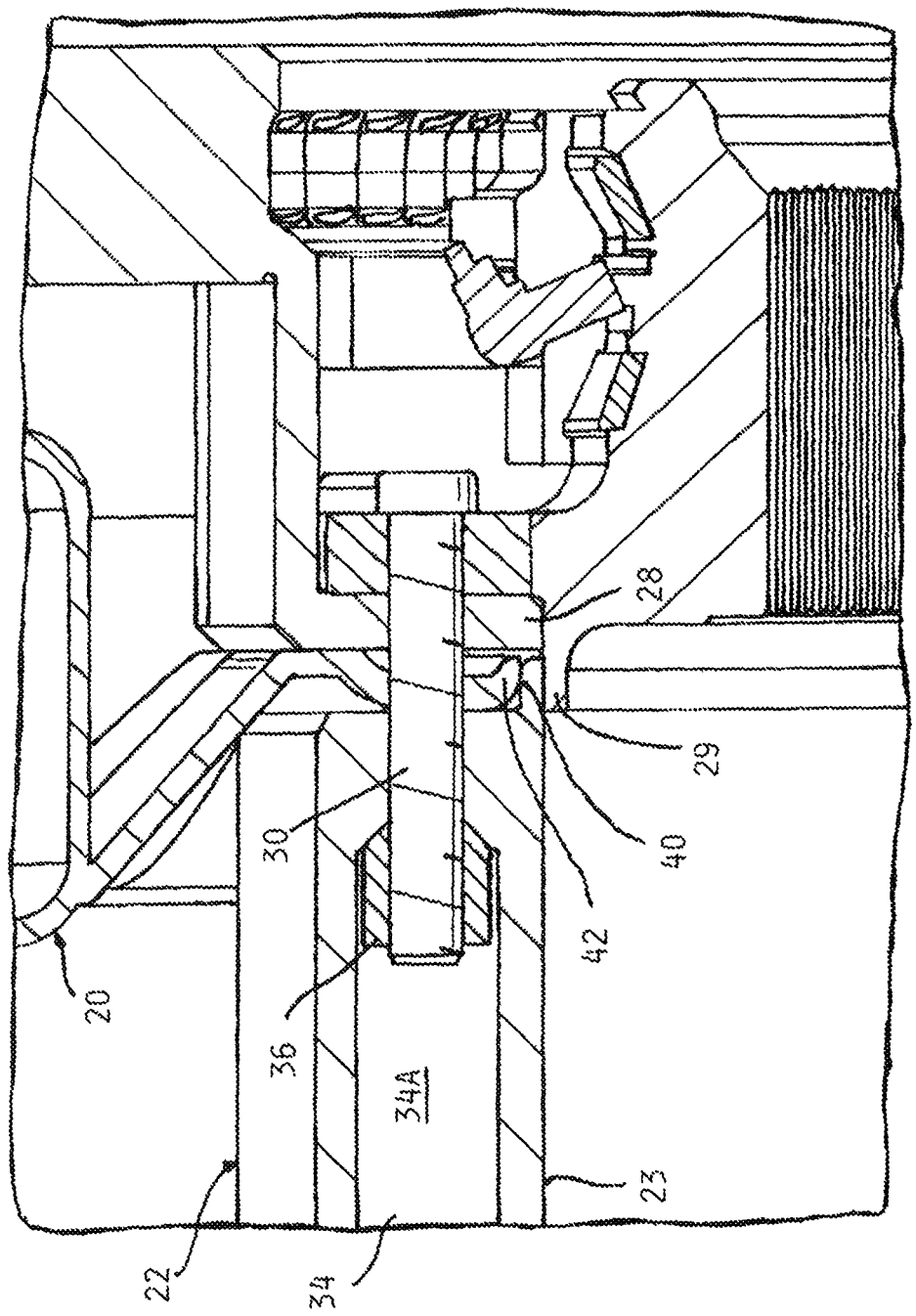
FIG. 7 is an enlarged fragmentary view of a portion of the partially sectional view of FIG. 2 on the right side.
Figure 8:
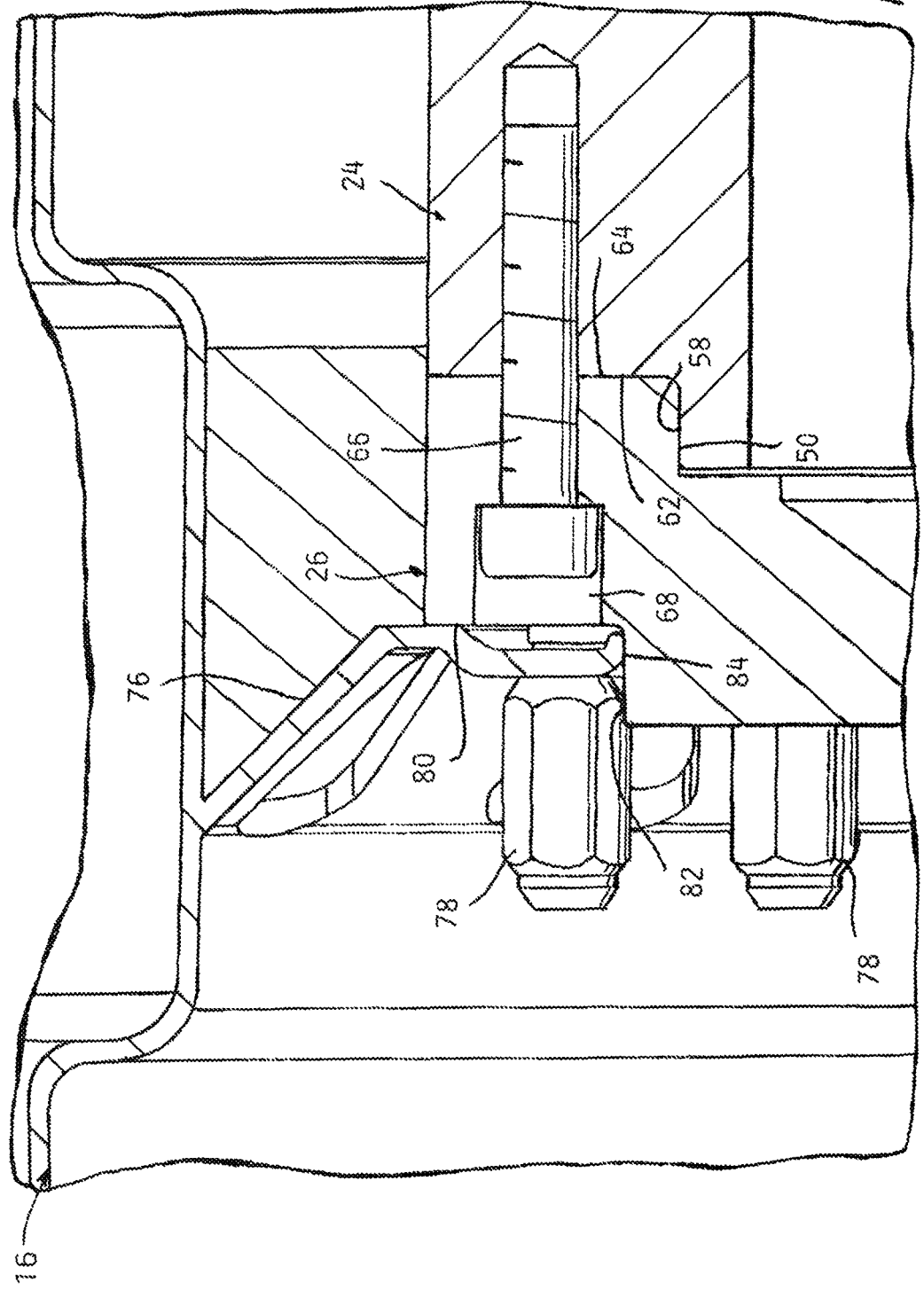
FIG. 8 is an enlarged fragmentary view of a portion of the sectional view of FIG. 2 on the left side.

Lug nuts 78 installed on the lug bolts 70 draw the rim 76 tightly against a left end 80 of outer spacer 26, as best seen in FIG. 7.

Outer spacer 26 has a reduced diameter shoulder 82 which slidably passes into the center hole 84 in the wheel rim 76.

The lug nuts 78 when tightened compress an angled lip 86 formed into the perimeter of the opening 84 (FIG. 7) against the step 81 formed by shoulder 82.

The perimeter of the opening 84 has a radial clearance with shoulder 82 to allow assembly but upon tightening of the lug nuts 78 and inward deflection of the lip 86 to engage the shoulder 82, all clearance therebetween is eliminated so that a tight fit is produced. This insures that no looseness develops over time, while assembly and disassembly of the wheel 12 is facilitated by the clearances which exist prior to tightening of the lug nuts 70.

The interfit spacers 22, 24, 26 when bolted together end to end provide a very sturdy cantilevered support for the auxiliary wheel 16 forming a unitary structure which will not loosen over time.

The thick walls of the spacers allow the use of aluminum in their construction to lighten their weight to enable easy handling when being installed and to reduce the rotating mass.

Standard wheel rims are used to lower the cost of the installation while the mounting ensures adequate spacing between the original and auxiliary wheels to avoid packing the space with dirt and other debris.

The deflection of the wheel rim lips insures a tight fit onto the mating spacers while allowing ready assembly of the wheel rims to the spacer assembly to thereby provides achievement of the objects of the invention recited above by the arrangement described.

The invention claimed is:

1. An arrangement for adding an auxiliary wheel comprised of a tire mounted on a wheel rim to an axle of a motor vehicle on which is installed an original equipment wheel comprised of a tire mounted on a wheel rim, said auxiliary wheel rim being of the same configuration as said original equipment wheel comprising:

a series of three generally cylindrical spacers attached together in end-to-end axial abutment with each other, including an inner spacer adjacent said original equipment wheel rim and having an annularly arranged series of holes, each receiving one of a set of stud bolts carried by an existing wheel brake assembly member of said vehicle, said inner spacer having an outer reduced diameter portion forming a shoulder receiving a rim of said original equipment wheel of said vehicle thereon, said inner spacer holes each counterbored to accept one of a set of stud nuts each threaded onto a respective stud bolt which are advanced on said stud bolts to draw an axially inside end closest to said brake assembly member of said inner spacer into abutment with said original equipment wheel rim and said wheel rim against said wheel brake assembly member;

an intermediate spacer having an axially inside end abutting an axially outside end of said inner spacer located axially away from said brake assembly member, with an annularly arranged set of bolts each passing through a respective one of a set of counterbored holes extending axially completely through said intermediate spacer and threaded into a respective one of a set of threaded holes extending in from said axially outside end of said inner spacer to fixedly hold said intermediate and inner spacers together axially abutted end to end by said bolts;

an outer spacer having an axially inside end abutting an axially outside end of said intermediate spacer with a set of annularly arranged counterbored holes extending through said outer spacer aligned with a set of threaded holes extending into said axially outside end of said intermediate spacer and a set of bolts each of which being installed in a respective one of said counterbored holes and advanced into a respective one of said set of threaded holes to hold said axially abutting ends of said outer spacer and intermediate spacer in abutment with each other;

a set of counterbored holes extending axially into said axially inside end of said outer spacer aligned with a set of holes formed in said rim of said auxiliary wheel, a set of stud bolts inserted into said counterbored holes and through said rim holes, with a set of stud nuts each installed on a respective one of said stud bolts so as to draw said auxiliary wheel rim against an outer end of said outer spacer, whereby said inner, intermediate and outer spacers are fixed together in end-to-end abutment and with said inner spacer fixed to said brake assembly member of said vehicle.

2. The arrangement according to claim 1 wherein one of said axially outside end of said inner spacer and said axially inside end of said intermediate spacer includes a reduced diameter portion formed thereon slidingly received inside an opening formed in the other of said ends.

3. The arrangement of claim 2 wherein one of said axially outside end of said intermediate spacer and said axially inside end of said outer spacer includes a reduced diameter portion formed thereon and wherein a bore is formed in the other spacer end slidingly receiving said reduced diameter portion.

4. The arrangement according to claim 3 wherein said inside end of a reduced diameter portion is formed on said axially inside end of said inner spacer adjacent said brake assembly member, and said rim of said original equipment wheel includes a hole slidably received over said reduced diameter portion of said inner spacer.

5. The arrangement according to claim 4 wherein said hole on said wheel rim of said original equipment wheel is defined by an angled lip inclined radially inwardly towards said reduced diameter portion of said inner spacer and said brake assembly member so that said rim is thereby compressed as said stud nuts are tightened, and said lip is thereby forced to be deflected radially inwardly and into contact with a circumferential surface of said reduced diameter portion of said inner spacer by said compressing of said rim between said brake assembly member and an end face of said inner spacer formed adjacent said reduced diameter portion thereof to eliminate any clearance between said lip and said circumferential surface of said reduced diameter portion thereof.

6. The arrangement according to claim 5 wherein said outside end of said outer spacer has a reduced diameter portion projecting axially outwardly from said outside end of said spacer of a diameter smaller than an hole in said auxiliary wheel rim received over said reduced diameter portion, said opening defined by a lip on said rim of said auxiliary wheel defining a perimeter of said opening, said lip angled down towards said reduced diameter portion and back towards an end face adjacent said reduced diameter portion, said rim opening defined by said lip being larger in diameter than said reduced diameter portion to allow said rim to be slidable onto said reduced diameter portion, said lip moved inwardly by tightening said stud nuts engaging a radially extending outside surface of said rim of said auxiliary wheel forcing said lip into engagement with said reduced diameter portion of said outer spacer thereby eliminating any clearance therebetween.

7. An arrangement for adding an auxiliary wheel comprised of a tire mounted on a wheel rim to an axle of a motor vehicle on which is installed an original equipment wheel including a tire and a rim, said auxiliary wheel being the same configuration as said original equipment wheel comprising:

a series of three generally cylindrical spacers attached together in end-to-end axial abutment with each other, including;

an inner spacer having an annularly arranged series of bolt holes, each receiving one of a set of stud bolts carried by a member of a wheel brake assembly of said vehicle, said inner spacer having a reduced diameter portion of an axially inside end adjacent said member received in a hole in said rim of said original equipment wheel of said vehicle thereon, said bolt holes counterbored to accept one of a set of stud nuts each threaded onto a respective stud bolt which are advanced on said stud bolts to draw said axially inside end of said inner spacer into abutment with a side of said original equipment wheel rim and compress said wheel rim against said brake assembly member;

an intermediate spacer having an axially inside end abutting an axially outside end of said inner spacer, said intermediate and inner spacers detachably are held fixed together abutted end to end; and, an outer spacer having an inside end abutting an axially outside end of said intermediate spacer, said ends of said outer spacer and intermediate spacer fixedly held in abutment with each other;

a set of through stud bolt holes extending axially into said inside end of said outer spacer aligned with a set of stud bolt holes formed in said rim of said auxiliary wheel, a set of stud bolts inserted into said stud bolt holes and through stud bolt holes in said rim, with a set of stud nuts each installed on a respective one of said stud bolts so as to draw a side of said wheel rim against an axially outer end of said outer spacer, whereby said inner, intermediate and outer spacers are fixed together in end-to-end abutment and said inside end of said inner spacer facing towards said member of said brake assembly of said vehicle and mounting said wheel rim of said original equipment wheel between said inside end of said inner spacer and said member of said brake and assembly and said outer spacer having said rim of said auxiliary wheel mounted thereto pressed against said outer end of said outer spacer.

8. The arrangement according to claim 7 wherein one of said axially outside end of said inner spacer or said axially inside end of said intermediate spacer has a reduced diameter portion formed thereon slidingly received into an opening forward in the other of said ends of said inner or intermediate spacers.

9. The arrangement of claim 8 wherein one of said outside end of said intermediate spacer or said inside end of said outer spacer has a reduced diameter portion formed thereon and a bore formed in the other of said ends slidably receives said reduced diameter portion therein.

10. The arrangement according to claim 8 wherein said axially inside end comprising said reduced diameter portion of said inner spacer adjacent said brake assembly member, with said hole in said rim of said original equipment wheel slidably receiving said reduced diameter portion of said inner spacer axially inside end.

11. The arrangement according to claim 10 wherein said original equipment wheel rim opening is defined by an angled lip inclined inwardly towards said reduced diameter portion of said inner spacer and said brake assembly member so that said rim is compressed between a radially extending surface of a shoulder formed by said reduced diameter portion and an adjacent radially extending surface of said brake assembly member as said set of stud nuts are tightened, whereby said lip is forced to be deflected inwardly and into contact with said inner reduced diameter portion to eliminate any clearance between said lip and a circumferential outer surface of said reduced diameter portion of said inner spacer axially inside end.

12. The arrangement according to claim 11 wherein said outer end of said outer spacer has a reduced diameter portion projecting axially outwardly end of a diameter smaller than an opening in said auxiliary wheel rim received over said reduced diameter portion of said outer spacer, said opening defined by a lip on said auxiliary wheel rim, said lip angled inwardly towards said reduced diameter portion and back towards radially extending face formed by said reduced diameter portion, said rim opening being larger in diameter than said reduced diameter portion to allow said rim to be slidably assembled onto said reduced diameter portion of said outer spacer, said rim side engaged by tightening said stud nuts engaging the an outer side of said rim of said auxiliary wheel forcing said rim against said radially extending face thereby causing said lip to move radially inwardly and into contact with said reduced diameter portion of said outer spacer to eliminate any clearance therebetween.

* * * * *